(12) United States Patent
Itoi et al.

(10) Patent No.: US 12,395,789 B2
(45) Date of Patent: Aug. 19, 2025

(54) IMAGE PICKUP APPARATUS CAPABLE OF EFFICIENTLY RETRIEVING SUBJECT GENERATING SPECIFIC SOUND FROM IMAGE, CONTROL METHOD FOR IMAGE PICKUP APPARATUS, AND STORAGE MEDIUM

(71) Applicant: CANON KABUSHIKI KAISHA, Tokyo (JP)

(72) Inventors: Yudai Itoi, Tokyo (JP); Shogo Fujiwara, Tokyo (JP); Kenichiro Sasai, Kanagawa (JP); Tatsuo Nishino, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 18/470,834

(22) Filed: Sep. 20, 2023

(65) Prior Publication Data

US 2024/0107226 A1    Mar. 28, 2024

(30) Foreign Application Priority Data

Sep. 22, 2022 (JP) ................................ 2022-151619

(51) Int. Cl.
*H04R 1/40* (2006.01)
*G10L 15/08* (2006.01)

(52) U.S. Cl.
CPC .............. *H04R 1/406* (2013.01); *G10L 15/08* (2013.01); *G10L 2015/088* (2013.01)

(58) Field of Classification Search
CPC .......... G06F 3/011; G06F 3/017; G06F 3/012; G06F 3/013; G06F 3/167; G06F 3/04842;
(Continued)

(56) References Cited

U.S. PATENT DOCUMENTS

2011/0013075 A1* 1/2011 Kim ....................... H04N 7/147
    348/370
2017/0265012 A1* 9/2017 Tico ........................ H04S 7/303
(Continued)

FOREIGN PATENT DOCUMENTS

JP      2020-150360 A    9/2020

*Primary Examiner* — Lun-See Lao
(74) *Attorney, Agent, or Firm* — Cowan, Liebowitz & Latman, P.C.

(57) ABSTRACT

An image pickup apparatus capable of efficiently retrieving a subject generating a specific sound from an image is provided. The image pickup apparatus includes an image pickup circuit, a CPU, and a memory that stores a program that, when executed by the CPU, causes the image pickup apparatus to function as: detecting a specific sound from a sound acquired by a sound acquisition unit during moving image capturing, judging a direction in which the specific sound comes toward the image pickup apparatus and acquiring information about a sound direction indicating the direction of the specific sound judged, judging a direction in which the image pickup apparatus is facing and acquiring information about an image capturing direction indicating the direction of the image pickup apparatus judged, and performing control to store attribute information, a moving image acquired by the image pickup circuit, and the sound in a storage unit.

15 Claims, 7 Drawing Sheets

(58) Field of Classification Search
CPC .. G06F 3/015; G06F 3/147; G06F 2203/0381; G06F 3/0304; G06F 3/0346; G06F 3/0482; G06F 3/0488; G06F 3/16; G06F 16/50; G06F 21/32; G06F 2203/04806; G06F 3/005; G06F 9/453; G06F 1/1694; G06F 16/00; G06F 16/217; G06F 16/24553; G06F 16/432; G06F 16/435; G06F 16/90332; G06F 16/90335; G06F 16/9035; G06F 16/9038; H04L 9/3239; H04L 9/50; H04L 2209/56; H04L 9/0866; H04L 9/32; H04L 9/3231; H04L 9/3247; H04L 9/0637; H04L 9/0852; H04L 9/3228; H04L 9/3252; H04L 51/046; H04L 51/10; H04L 51/222; H04L 51/52; H04L 63/0861; H04L 67/10; H04L 9/0643; H04L 9/0841; G10L 2015/223; G10L 15/26; G10L 15/1815; G10L 15/22; G01C 21/36; G01C 21/3691; G06K 7/10396
USPC .............................................. 381/92, 26–28
See application file for complete search history.

(56) References Cited

U.S. PATENT DOCUMENTS

| | | | |
|---|---|---|---|
| 2018/0117762 A1* | 5/2018 | Earwood | B25J 9/1605 |
| 2020/0296321 A1* | 9/2020 | Haraguchi | H04N 5/772 |
| 2021/0204023 A1* | 7/2021 | Knox | H04N 21/42201 |

\* cited by examiner

MOVING IMAGE DATA/SOUND DATA

ATTRIBUTE INFORMATION

| TIMING AT WHICH SPECIFIC SOUND HAS BEEN DETECTED | SOUND DIRECTION | IMAGE CAPTURING DIRECTION | IMAGE CAPTURING POSITION | ANGLE OF VIEW OF MOVING IMAGE (FOCAL LENGTH) | SUBJECT TYPE | SOUND COLLECTION RANGE |
|---|---|---|---|---|---|---|
| 00:00:00 | DIRECTION OF 90 DEGREES | DIRECTION OF 270 DEGREES | COORDINATES (x,y) | 50mm | NOT DETECTED | RANGE OF 120° FORWARD |
| 00:00:30 | DIRECTION OF 90 DEGREES | DIRECTION OF 90 DEGREES | COORDINATES (x,y) | 50mm | FACE OF PERSON DETECTED | RANGE OF 120° FORWARD |
| 00:00:55 | DIRECTION OF 45 DEGREES | DIRECTION OF 90 DEGREES | COORDINATES (x,y) | 100mm | NOT DETECTED | RANGE OF 90° FORWARD |
| ⋮ | ⋮ | ⋮ | ⋮ | ⋮ | ⋮ | ⋮ |

| TIMING AT WHICH SPECIFIC SUBJECT HAS BEEN DETECTED | SOUND DIRECTION | IMAGE CAPTURING DIRECTION | IMAGE CAPTURING POSITION | ANGLE OF VIEW OF MOVING IMAGE (FOCAL LENGTH) | SUBJECT TYPE | SOUND COLLECTION RANGE |
|---|---|---|---|---|---|---|
| 00:00:30 | DIRECTION OF 90 DEGREES | DIRECTION OF 90 DEGREES | COORDINATES (x,y) | 50mm | FACE OF PERSON DETECTED | RANGE OF 120° FORWARD |
| 00:01:05 | DIRECTION OF 90 DEGREES | DIRECTION OF 110 DEGREES | COORDINATES (x,y) | 100mm | FACE OF PERSON DETECTED | RANGE OF 120° FORWARD |
| ⋮ | ⋮ | ⋮ | ⋮ | ⋮ | ⋮ | ⋮ |

IMAGE PICKUP APPARATUS CAPABLE OF EFFICIENTLY RETRIEVING SUBJECT GENERATING SPECIFIC SOUND FROM IMAGE, CONTROL METHOD FOR IMAGE PICKUP APPARATUS, AND STORAGE MEDIUM

BACKGROUND OF THE INVENTION

Field of the Invention

The present invention relates to an image pickup apparatus, a control method for the image pickup apparatus, and a storage medium.

Description of the Related Art

Conventionally, an image pickup apparatus that records video data and attribute information regarding the video data has been known. There have been proposed techniques for improving analyzability and searchability of the video data by using the attribute information recorded in this manner. For example, Japanese Laid-Open Patent Publication (kokai) No. 2020-150360 discloses a technique that makes it easy to create a report based on video data by adding a direction of a sound (a sound direction) to the video data as attribute information.

However, in the technique disclosed in Japanese Laid-Open Patent Publication (kokai) No. 2020-150360, it is difficult to judge whether or not a subject that is a source of a sound is captured in the video even with reference to the sound direction that is the attribute information. Furthermore, it is useful for a user to easily find a video in which a subject generating a specific sound is captured. For example, it is effective in easily finding a scene where a child is laughing after the user photographs the child. Alternatively, it is effective in easily finding and confirming a situation when a noise occurred from a video photographed by a security camera.

SUMMARY OF THE INVENTION

The present invention provides an image pickup apparatus capable of efficiently retrieving a subject generating a specific sound from an image, a control method for the image pickup apparatus, and a storage medium.

Accordingly, the present invention provides an image pickup apparatus comprising an image pickup circuit, a CPU, and a memory that stores a program that, when executed by the CPU, causes the image pickup apparatus to function as the following units: a sound acquisition unit that acquires a sound, a sound detection unit that detects a specific sound from a sound acquired by the sound acquisition unit during moving image capturing performed by the image pickup circuit, a first judging unit that judges a direction in which the specific sound comes toward the image pickup apparatus and acquires information about a sound direction indicating the direction of the specific sound judged, a second judging unit that judges a direction in which the image pickup apparatus is facing and acquires information about an image capturing direction indicating the direction of the image pickup apparatus judged, and a control unit that performs control so as to store attribute information, which includes information indicating a first detection timing at which the specific sound has been detected by the sound detection unit during the moving image capturing performed by the image pickup circuit, information about the sound direction corresponding to the first detection timing, and information about the image capturing direction corresponding to the first detection timing, a moving image acquired by the image pickup circuit, and the sound acquired by the sound acquisition unit in a storage unit.

According to the present invention, it is possible to efficiently retrieve the subject generating the specific sound from the image.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Hereinafter, an embodiment of the present invention will be described in detail with reference to the drawings. However, the configuration described in the present embodiment is merely an example, and the scope of the present invention is not limited by the configuration described in the present embodiment. For example, each part constituting the present invention can be replaced with a part having any configuration capable of exhibiting similar functions. In addition, any component may be added. Furthermore, any two or more configurations (features) of the present embodiment can be combined.

Figure 1:
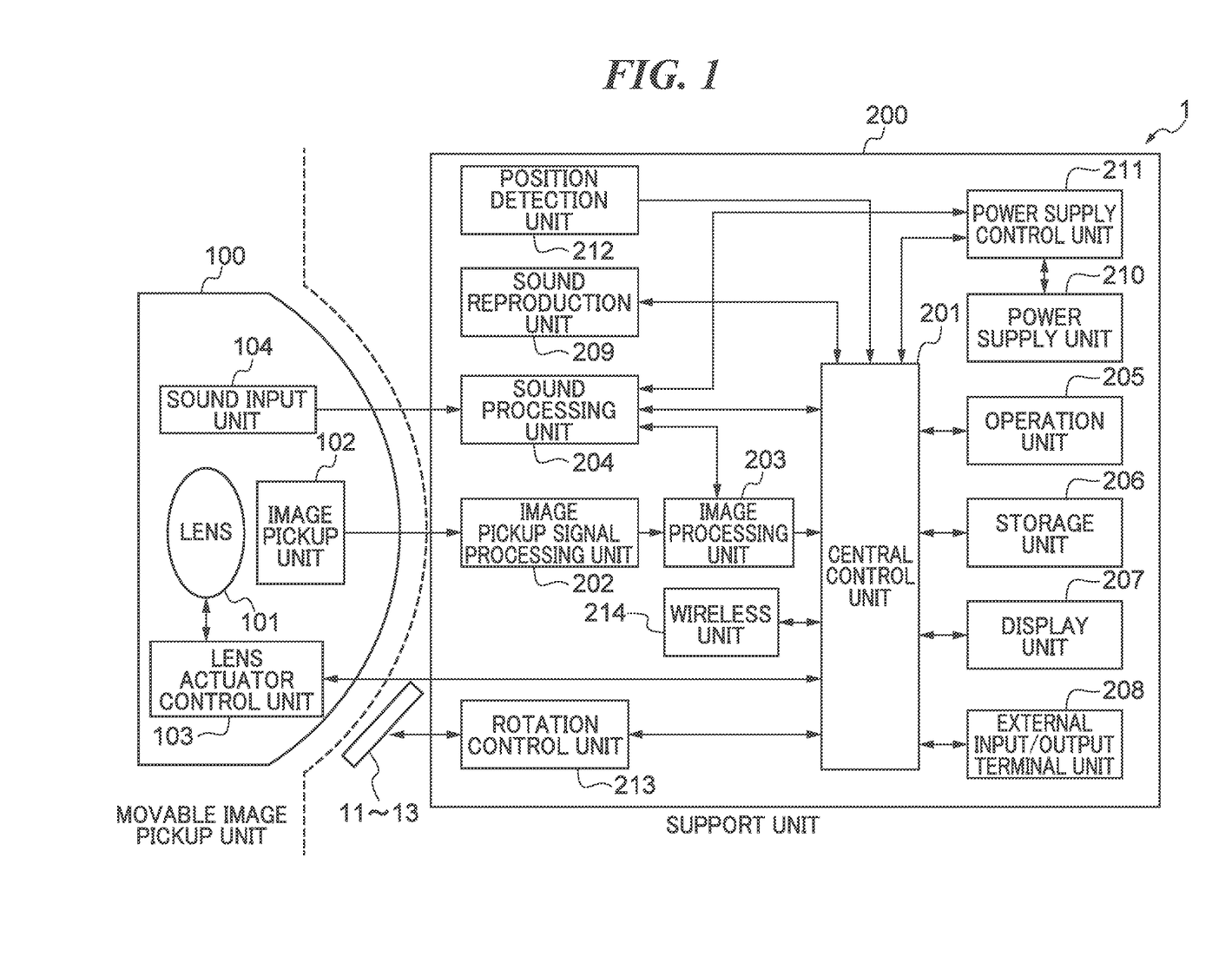
FIG. 1 is a block diagram that shows an image pickup apparatus according to an embodiment of the present invention.

FIG. 1 is a block diagram that shows an image pickup apparatus 1 according to the present embodiment. As shown in FIG. 1, the image pickup apparatus 1 includes a movable image pickup unit 100 and a support unit 200. The movable image pickup unit 100 includes an optical lens unit and a plurality of microphones, and acquires image data and sound data. The support unit 200 includes a control unit that controls driving of the movable image pickup unit 100 and a central control unit (a CPU) that controls the entire image pickup apparatus 1. It should be noted that the support unit 200 is configured to enable the movable image pickup unit 100 to move in any direction by using a plurality of movable image pickup unit control actuators 11 to 13. In the present embodiment, the image pickup apparatus 1 functions as a digital camera. However, the image pickup apparatus 1 is not limited to the digital camera, and may be, for example, a digital camera, a video camera, a smartphone, a tablet terminal, or the like that is attached to a camera platform. Furthermore, the image pickup apparatus 1 may be a digital camera, a video camera, a smartphone, a tablet terminal, or the like that performs photographing manually.

First, the configuration of the movable image pickup unit 100 will be described. A lens 101 is a lens unit. In the lens 101, an image capturing optical system (a photographing optical system) is configured by a zoom unit, a diaphragm and shutter unit, a focus unit, etc. The image pickup unit 102 (an image pickup circuit) includes an image pickup device such as a complementary metal oxide semiconductor (CMOS) sensor or a charge coupled device (CCD) sensor, photoelectrically converts an optical image formed by (each lens group of) the image capturing optical system, and outputs electrical signals. A lens actuator control unit 103 includes a motor driver integrated circuit (a motor driver IC), and drives respective actuators such as the zoom unit, the diaphragm and shutter unit, the focus unit of the lens 101. Driving of the respective actuators is performed on the basis of actuator drive instruction data received from a central control unit 201 that will be described below. A sound input unit 104 (a sound acquisition unit) includes the plurality of microphones, and converts an acquired sound into digital data, and outputs the digital data.

Next, the configuration of the support unit 200 will be described. The central control unit 201 controls the entire image pickup apparatus 1. The central control unit 201 includes a central processing unit (CPU), a read only memory (ROM) that stores programs executed by the CPU, a random access memory (RAM) that is used as a working area of the CPU, etc. An image pickup signal processing unit 202 converts the electrical signals outputted from the image pickup unit 102 into image data. An image processing unit 203 processes the image data outputted from the image pickup signal processing unit 202 according to the purpose of use. The image processing unit 203 also performs processes such as image cutout and electronic image stabilization operation by a rotation processing. Furthermore, the processes performed by the image processing unit 203 include a process of recognizing and detecting a specific subject (for example, a face of a specific person).

A sound processing unit 204 performs a sound processing with respect to the sound data from the sound input unit 104. In the case that the sound input unit 104 outputs sound signals as analog signals, the sound processing unit 204 includes a configuration that converts the sound signals into digital signals. It should be noted that the sound processing unit 204 including the sound input unit 104 will be described in detail below. An operation unit 205 is provided to operate the image pickup apparatus 10. A storage unit 206 is provided to store various types of data such as image data and sound data acquired by moving image capturing. When storing a moving image, which is the image data, and the sound data in the storage unit 206, the central control unit 201 adds various types of attribute information regarding the photographed moving image to the image data and the sound data, and then stores the image data and the sound data in the storage unit 206. The attribute information includes information such as a timing at which a specific sound has been detected, a direction in which the specific sound has arrived (a sound direction), an image capturing direction (a photographing direction), an image capturing position (a photographing position), an image capturing view angle (an angle of view), a subject type (a type of a subject), and a sound collection range, and the detailed descriptions thereof will be provided below. It should be noted that the information included in the attribute information is not limited to the above-described information such as the timing at which the specific sound has been detected, and may be another information.

A display unit 207 includes a display such as a liquid crystal display (LCD). If necessary, the central control unit 201 performs image display on the display unit 207 on the basis of the signals outputted from the image processing unit 203. An external input/output terminal unit 208 communicates with an external device. In addition, the external input/output terminal unit 208 inputs and outputs the image data and the sound data into and from the external device. A sound reproduction unit 209 includes a speaker, converts the sound data into electrical signals, and outputs the electrical signals. A power supply unit 210 supplies power to the entire image pickup apparatus 1 (each component of the image pickup apparatus 1) according to the purpose of use. A power supply control unit 211 performs control to individually start and stop a power supply different from the power supply unit 210. A position detection unit 212 includes a gyro sensor, an acceleration sensor, and the like, and detects a movement of the image pickup apparatus 1.

A rotation control unit 213 is able to move the movable image pickup unit 100 in any direction at any speed by energizing the movable image pickup unit control actuators 11 to 13 in response to an instruction from the user. It should be noted that although the movable image pickup unit control actuators 11 to 13 include three vibrators, the number of the actuators is not limited to three, and the type of the actuator is not limited to the vibrator. The rotation control unit 213 realizes multi-degree-of-freedom driving of the movable image pickup unit 100 by appropriately operating some or all of the plurality of vibrators. Furthermore, the central control unit 201 detects a direction in which the image pickup apparatus 1 is facing, that is, detects a direction in which the image pickup unit 102 of the movable image pickup unit 100 is facing, by communication with the rotation control unit 213. It should be noted that the detection of the image capturing direction is not limited to what is described above, and may be performed, for example, by using an azimuth sensor or the like. A wireless unit 214 performs communication of data such as the image data and the sound data in accordance with a wireless standard such as Wi-Fi (registered trademark) or Bluetooth (registered trademark) low energy (BLE).

Figure 2:
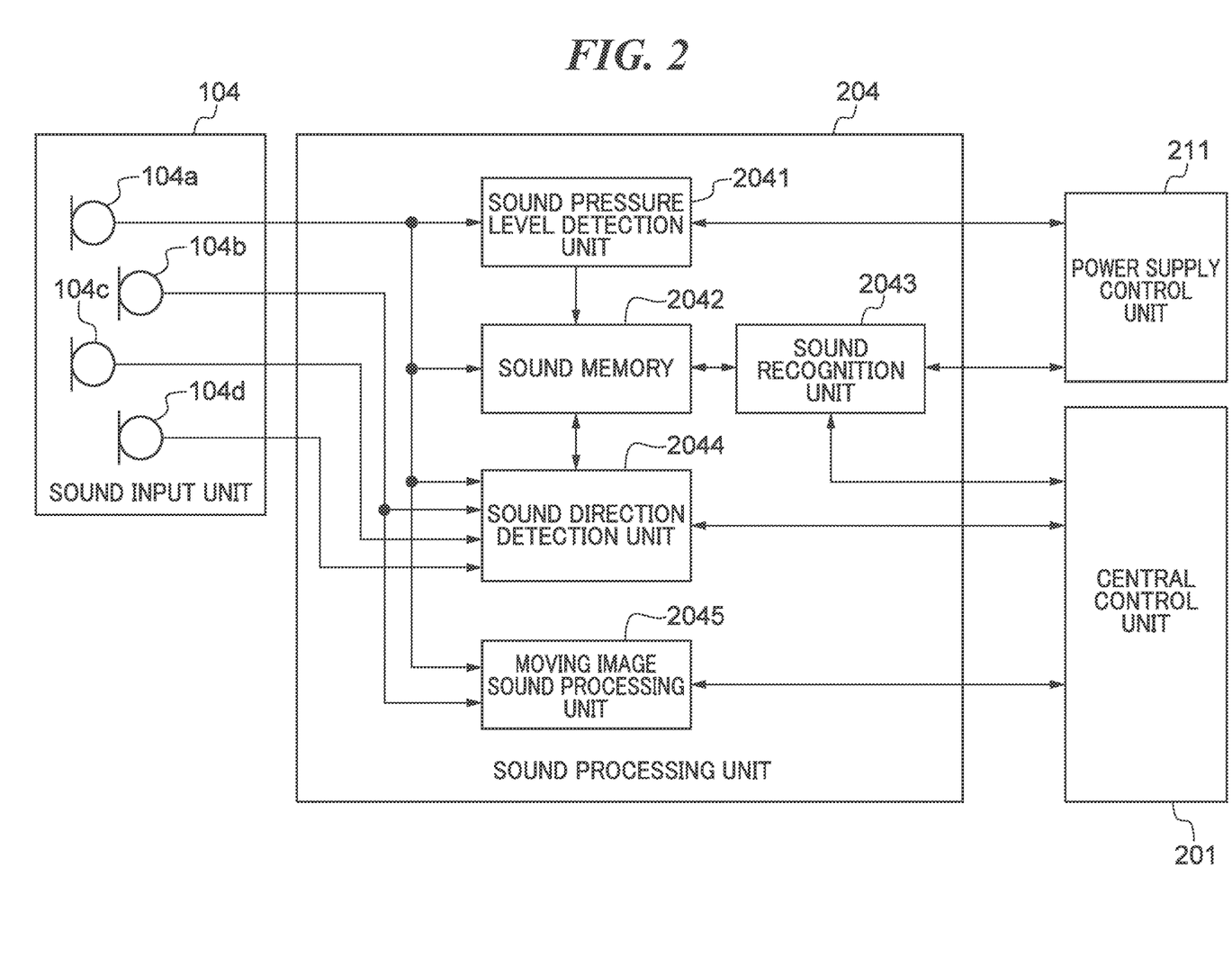
FIG. 2 is a block diagram that shows a sound input unit and a sound processing unit of the image pickup apparatus.

FIG. 2 is a block diagram that shows the sound input unit 104 and the sound processing unit 204 of the image pickup apparatus 1. The sound input unit 104 includes a microphone 104a, a microphone 104b, a microphone 104c, and a microphone 104d. Each of the microphones 104a to 104d is a non-directional microphone having an A/D function. The sound input unit 104 includes the digital microphones as described above, but is not limited thereto, and may include analog-output microphones. In addition, the sound input unit 104 includes four microphones, but is not limited thereto, and only needs to include two or more microphones.

The sound processing unit 204 includes a sound pressure level detection unit 2041, a sound memory 2042, a sound recognition unit 2043, a sound direction detection unit 2044, and a moving image sound processing unit 2045. The sound pressure level detection unit 2041 detects that an output level of the microphone 104a is equal to or higher than a threshold. In the sound memory 2042, data on children's characteristic voices such as children's laughing voices, children's crying voices, and children's singing voices is stored in advance as sound data for a command. Further, in the sound memory 2042, output data of the microphone 104a is sequentially stored in response to an output signal from the sound pressure level detection unit 2041.

The sound recognition unit 2043 compares the specific sound data stored in advance in the sound memory 2042 with the sound data sequentially stored in the sound memory 2042, and determines whether or not the two compared pieces of sound data match each other. As a result, the sound recognition unit 2043 is able to recognize and detect a specific sound. Furthermore, the sound recognition unit 2043 is also able to analyze the sound data sequentially stored in the sound memory 2042, and determine whether or not the sequentially-stored sound data includes a specific frequency component. As a result, the sound recognition unit 2043 is able to recognize and detect a sound including the specific frequency component as the specific sound.

Furthermore, the sound recognition unit 2043 is also able to analyze the sound data sequentially stored in the sound memory 2042, and determine whether or not the sequentially-stored sound data includes a sound exceeding a specific sound pressure level. As a result, the sound recognition unit 2043 is able to recognize and detect the sound exceeding the specific sound pressure level as the specific sound. Furthermore, the sound recognition unit 2043 is also able to analyze a sound included in the sound data sequentially stored in the sound memory 2042, and determine whether or not a specific word is included in the sound included in the sound data sequentially stored in the sound memory 2042. As a result, the sound recognition unit 2043 is able to recognize and detect the sound including the specific word as the specific sound. Furthermore, the sound recognition unit 2043 is also able to analyze a sound included in the sound data sequentially stored in the sound memory 2042, and estimate an emotion of a person who has made the sound included in the sound data sequentially stored in the sound memory 2042. As a result, the sound recognition unit 2043 is able to recognize and detect the sound, from which a specific emotion is estimated, as the specific sound.

The sound direction detection unit 2044 detects a direction in which a sound comes toward the image pickup apparatus 1 and outputs the detected direction as a sound direction, based on the output data of the microphone 104a, the microphone 104b, the microphone 104c, and the microphone 104d. The moving image sound processing unit 2045 performs various kinds of filtering processes and a sound process for moving image sound such as wind cutting with respect to the output data of the microphone 104a and the microphone 104b. Moreover, the moving image sound processing unit 2045 performs sound processes for moving image sound, such as stereo enhancement, driving sound cancellation, auto level control (ALC), and compression processing, with respect to the output data of the microphone 104a and the microphone 104b. When performing the sound processes for moving image sound, the moving image sound processing unit 2045 handles the microphone 104a as Lch and handles the microphone 104b as Rch.

In the present embodiment, the power supply is individually controlled for each block of the sound processing unit 204 by the central control unit 201. Furthermore, if necessary, the power supply is controlled to be turned on or off for each block of the sound processing unit 204 by the central control unit 201. In addition, the power supply control unit 211 controls the power supply for each block of the sound processing unit 204 on the basis of information from the sound pressure level detection unit 2041 and the sound recognition unit 2043. It should be noted that, in the present embodiment, the connections between the microphones 104a to 104d of the sound input unit 104 and the blocks included in the sound processing unit 204 are minimum connections necessary for the microphones 104a to 104d in consideration of power consumption and the circuit configuration. However, the sound processing unit 204 may use a plurality of microphones among the microphone 104a, the microphone 104b, the microphone 104c, and the microphone 104d to be shared by the blocks included in the sound processing unit 204 as long as the power consumption and the circuit configuration allow such sharing. Further, in the present embodiment, although the microphone 104a is connected to the sound processing unit 204 as a reference microphone, any microphone among the microphone 104a, the microphone 104b, the microphone 104c, and the microphone 104d may be the reference microphone.

Figure 3:
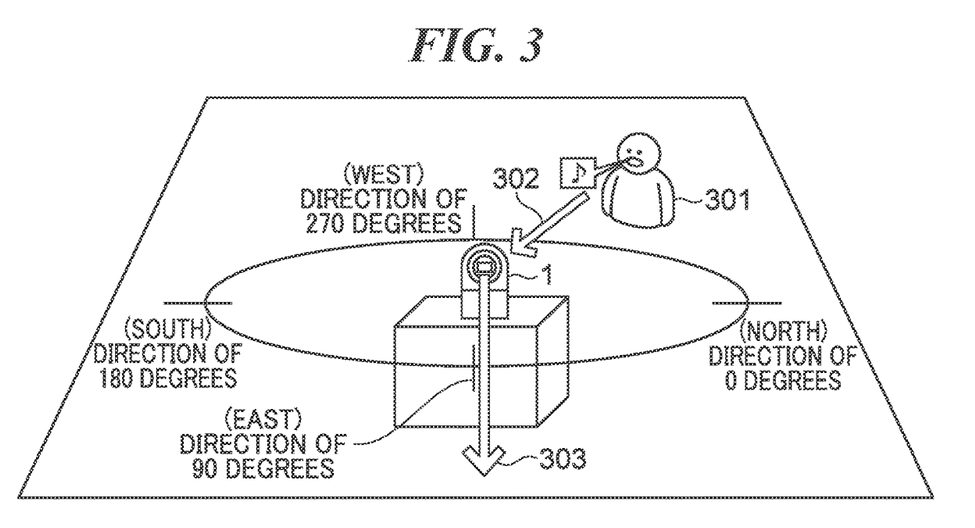
FIG. 3 is a diagram that shows an example of definitions of an image capturing direction and a sound direction.

Hereinafter, a process for adding the attribute information to the image data and stores the image data by the image pickup apparatus 1 will be described with reference to FIGS. 3 to 6. Furthermore, a process for cutting out a portion of the moving image data by referring to the attribute information will be described with reference to FIG. 7. FIG. 3 is a diagram that shows an example of definitions of the image capturing direction and the sound direction that are described above. In FIG. 3, the image pickup apparatus 1 is the same as the image pickup apparatus 1 shown in FIG. 1. A person 301 is a source of a sound. A voice (a sound) uttered by the person 301 is detected and stored by the image pickup apparatus 1. It should be noted that the source of the sound is not limited to the person 301, and may be another source. Furthermore, the sound detected and stored by the image pickup apparatus 1 is not limited to the voice uttered by the person 301, and may be another sound. An arrow 302 indicates the sound direction, that is, indicates the direction in which the sound comes toward the image pickup apparatus 1. In other words, the arrow 302 indicates from which direction the sound has arrived at the image pickup apparatus 1. In addition, an arrow 303 indicates the image capturing direction. The image capturing direction indicates the direction in which the image pickup apparatus 1 is facing, i.e., the direction in which the image pickup unit 102 of the movable image pickup unit 100 is facing. Therefore, the arrow 303 indicates in which direction the image pickup unit 102 of the movable image pickup unit 100 is facing in the moving image capturing. As shown in FIG. 3, the sound direction and the image capturing direction are represented by clockwise azimuth angles with the north direction as 0° when the image pickup apparatus 1 is viewed from above. However, the way of representing the sound direction and the image capturing direction is not limited to the above-described way of representing the sound direction and the image capturing direction, and the sound direction and the image capturing direction may be represented by using, for example, a two-dimensional vector, a three-dimensional vector, or the like.

Figure 4:
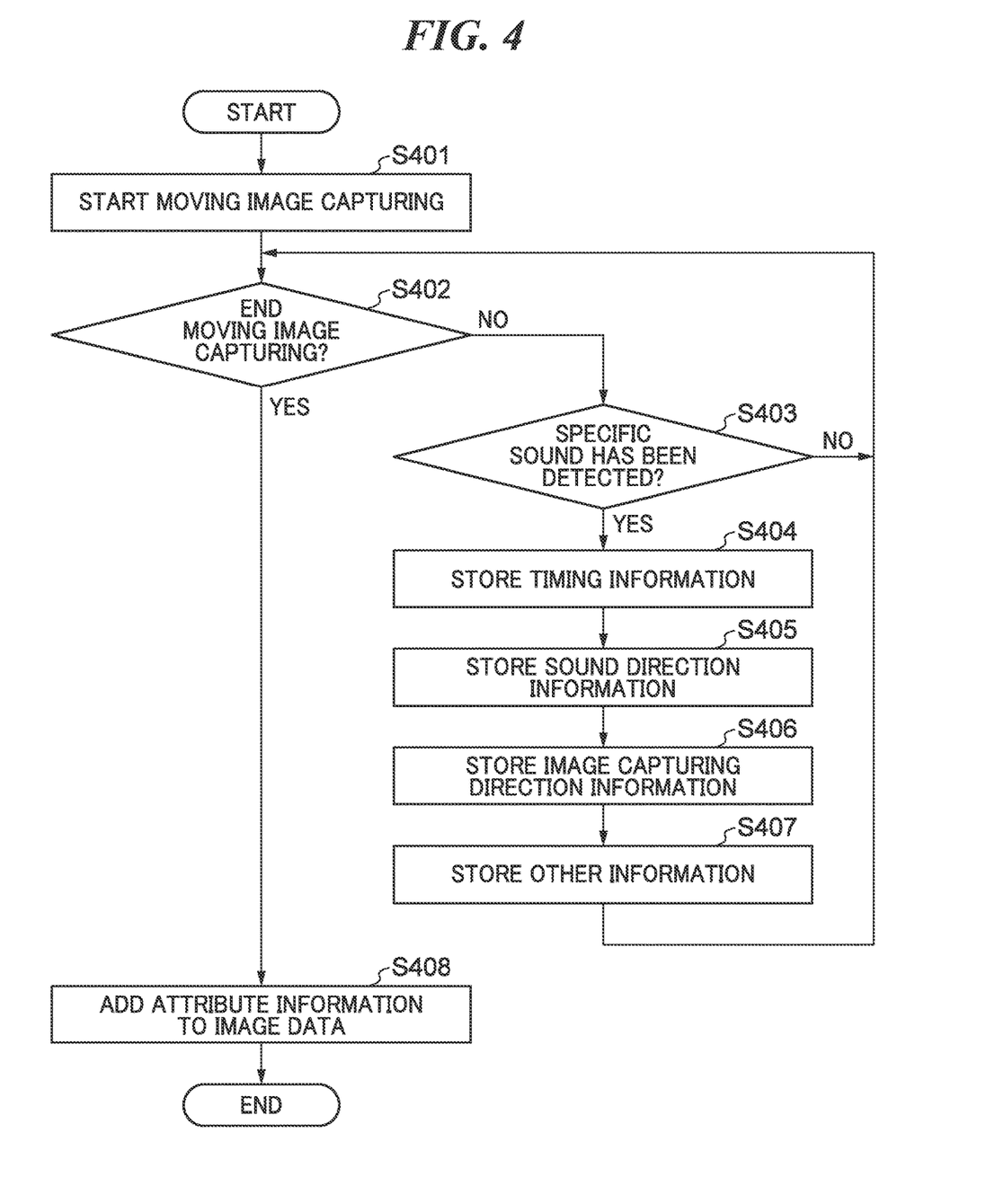
FIG. 4 is a flowchart that shows a processing for adding attribute information when the image pickup apparatus has detected a specific sound to image data.

FIG. 4 is a flowchart that shows a process for adding the attribute information to the moving image and the sound. Steps S401 to S408 in the flowchart of FIG. 4 are implemented in such a manner that the CPU (a computer) of the central control unit 201 loads a program stored in the ROM to the RAM and executes the program. As shown in FIG. 4, in the step S401, the central control unit 201 starts moving image capturing performed by the image pickup apparatus 1. This processing is performed in response to a user's operation on the operation unit 205. When the moving image capturing is started, the central control unit 201 stores moving image data acquired by the moving image capturing in the storage unit 206.

In the step S402, the central control unit 201 determines whether or not to end the moving image capturing performed by the image pickup apparatus 1. This determination is performed on the basis of the user's operation on the operation unit 205. In the case that the central control unit 201 determines to end the moving image capturing, the processing proceeds to the step S408. At this time, the central control unit 201 ends the moving image capturing. On the other hand, in the case that the central control unit 201 determines not to end the moving image capturing, the processing proceeds to the step S403.

In the step S403, the central control unit 201 determines whether or not the specific sound has been detected. This determination is performed on the basis of detection performed by the sound recognition unit 2043. In the case that the central control unit 201 determines that the specific sound has not been detected, the processing returns to the step S402. On the other hand, in the case that the central control unit 201 determines that the specific sound has been detected, the processing proceeds to the step S404. It should be noted that in the present embodiment, although the specific sound is a voice of a person, the specific sound may be the sound exceeding the specific sound pressure level, a sound including the specific frequency component, a sound including the specific word, the sound from which the specific emotion is estimated, or the like.

In the step S404, the central control unit 201 stores information, which indicates a detection timing that is a timing at which the specific sound has been detected by the sound recognition unit 2043, in the storage unit 206. In the present embodiment, the central control unit 201 incorporates a clock. The central control unit 201 measures an elapsed time from the start of the moving image capturing based on the time of the clock. In addition, the central control unit 201 stores the elapsed time from the start of the moving image capturing in the storage unit 206 as the information indicating the first detection timing. In the step S405, the central control unit 201 stores information about the sound direction at the timing at which the specific sound has been detected by the sound recognition unit 2043 in the storage unit 206. As described above, the sound direction is detected by the sound direction detection unit 2044. In the step S406, the central control unit 201 stores information about the image capturing direction at the timing at which the specific sound has been detected by the sound recognition unit 2043 in the storage unit 206. As described above, the image capturing direction is detected by the central control unit 201 via communications with the rotation control unit 213.

In the step S407, the central control unit 201 stores other information at the timing at which the specific sound has been detected by the sound recognition unit 2043 in the storage unit 206. The other information includes information about the image capturing position of the image pickup apparatus 1, information about an angle of the moving image captured by the image pickup apparatus 1, information about the subject type in the moving image captured by the image pickup apparatus 1, and information about the sound collection range of the sound input unit 104. The image capturing position of the image pickup apparatus 1 is determined by the central control unit 201 on the basis of a detection signal from the position detection unit 212. The angle of view of the moving image captured by the image pickup apparatus 1 is detected by the central control unit 201 via communications with the lens actuator control unit 103. The subject type in the moving image captured by the image pickup apparatus 1 indicates whether or not the face of a person has been detected in the moving image captured by the image pickup apparatus 1 (indicates the presence or absence of detection of the face of the person). The face of the person is detected by the image processing unit 203 based on the image data outputted from the image pickup signal processing unit 202. In the step S408, the central control unit 201 adds the respective pieces of information stored in the steps S404, S405, S406, and S407 in the storage unit 206 to the moving image data acquired by the moving image capturing as the attribute information. As a result, the central control unit 201 stores the attribute information, the moving image data, and the sound data in the same file and stores the file in the storage unit 206. Thereafter, the flowchart of FIG. 4 ends.

Figure 5:
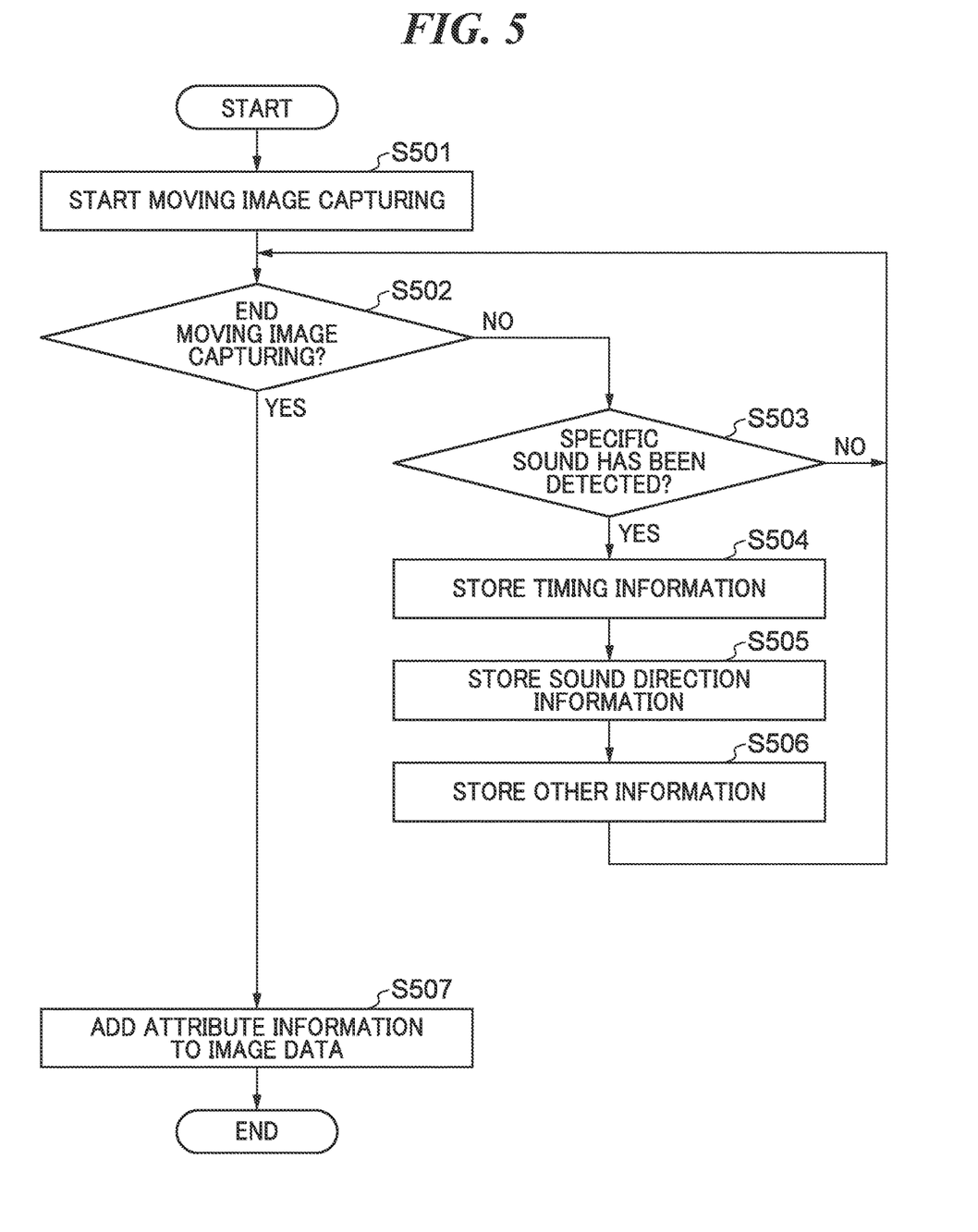
FIG. 5 is a flowchart that shows a processing for adding attribute information when the image pickup apparatus has detected a specific subject to image data.

FIG. 5 is a flowchart that shows a process for adding the attribute information when the image pickup apparatus 1 has detected the specific subject to the moving image data. Steps S501 to S507 in the flowchart of FIG. 5 are implemented in such a manner that the CPU of the central control unit 201 loads a program stored in the ROM to the RAM and executes the program. As shown in FIG. 5, in the step S501, the central control unit 201 starts moving image capturing performed by the image pickup apparatus 1. This processing is performed in response to the user's operation on the operation unit 205. When the moving image capturing is started, the central control unit 201 stores image data acquired by the moving image capturing in the storage unit 206.

In the step S502, the central control unit 201 judges whether or not to end the moving image capturing performed by the image pickup apparatus 1. This judgement is performed on the basis of the user's operation on the operation unit 205. In the case that the central control unit 201 judges to end the moving image capturing performed by the image pickup apparatus 1, the processing proceeds to the step S507. At this time, the central control unit 201 ends the moving image capturing performed by the image pickup apparatus 1. On the other hand, in the case that the central control unit 201 judges not to end the moving image capturing performed by the image pickup apparatus 1, the processing proceeds to the step S503.

In the step S503, the central control unit 201 determines whether or not the specific subject has been detected. This determination is performed on the basis of detection performed by the image processing unit 203. In the case that the central control unit 201 determines that the specific subject has not been detected, the processing returns to the step S502. On the other hand, in the case that the central control unit 201 determines that the specific subject has been detected, the processing proceeds to the step S504. It should be noted that in the present embodiment, although the specific subject is the face of the specific person, the specific subject may be a subject other than the specific person. In the step S504, the central control unit 201 stores information, which indicates a timing (a second detection timing) at which the specific subject has been detected by the image processing unit 203, in the storage unit 206. In the step S505, the central control unit 201 stores information about the sound direction at the timing at which the specific subject has been detected by the image processing unit 203 in the storage unit 206. As described above, the sound direction is detected by the sound direction detection unit 2044.

In the step S506, the central control unit 201 stores other information at the timing at which the specific subject has been detected by the image processing unit 203 in the storage unit 206. The other information includes the information about the image capturing direction, the information about the image capturing position of the image pickup apparatus 1, the information about the angle of view of the moving image captured by the image pickup apparatus 1, the information about the subject type in the moving image captured by the image pickup apparatus 1, and the information about the sound collection range of the sound input unit 104. The image capturing direction is determined by the central control unit 201 via communications with the rotation control unit 213. The image capturing position of the image pickup apparatus 1 is determined by the central control unit 201 on the basis of the detection signal from the position detection unit 212. The angle of view of the moving image captured by the image pickup apparatus 1 is detected by the central control unit 201 via communications with the lens actuator control unit 103. The subject type in the moving image captured by the image pickup apparatus 1 indicates whether or not the face of a person has been detected. The face of the person is detected by the image processing unit 203 based on video signals outputted from the image pickup signal processing unit 202. In the step S507, the central control unit 201 adds the respective pieces of information stored in the steps S504, S505, and S506 in the storage unit 206 to the image data acquired by the moving image capturing as the attribute information. As a result, the central control unit 201 stores the attribute information, the moving image data, and the sound data in the same file and stores the file in the storage unit 206. Thereafter, the flowchart of FIG. 5 ends. It should be noted that, in the present embodiment, the processing of FIG. 4 and the processing of FIG. 5 are simultaneously executed by the central control unit 201 during the moving image capturing.

Figure 6:
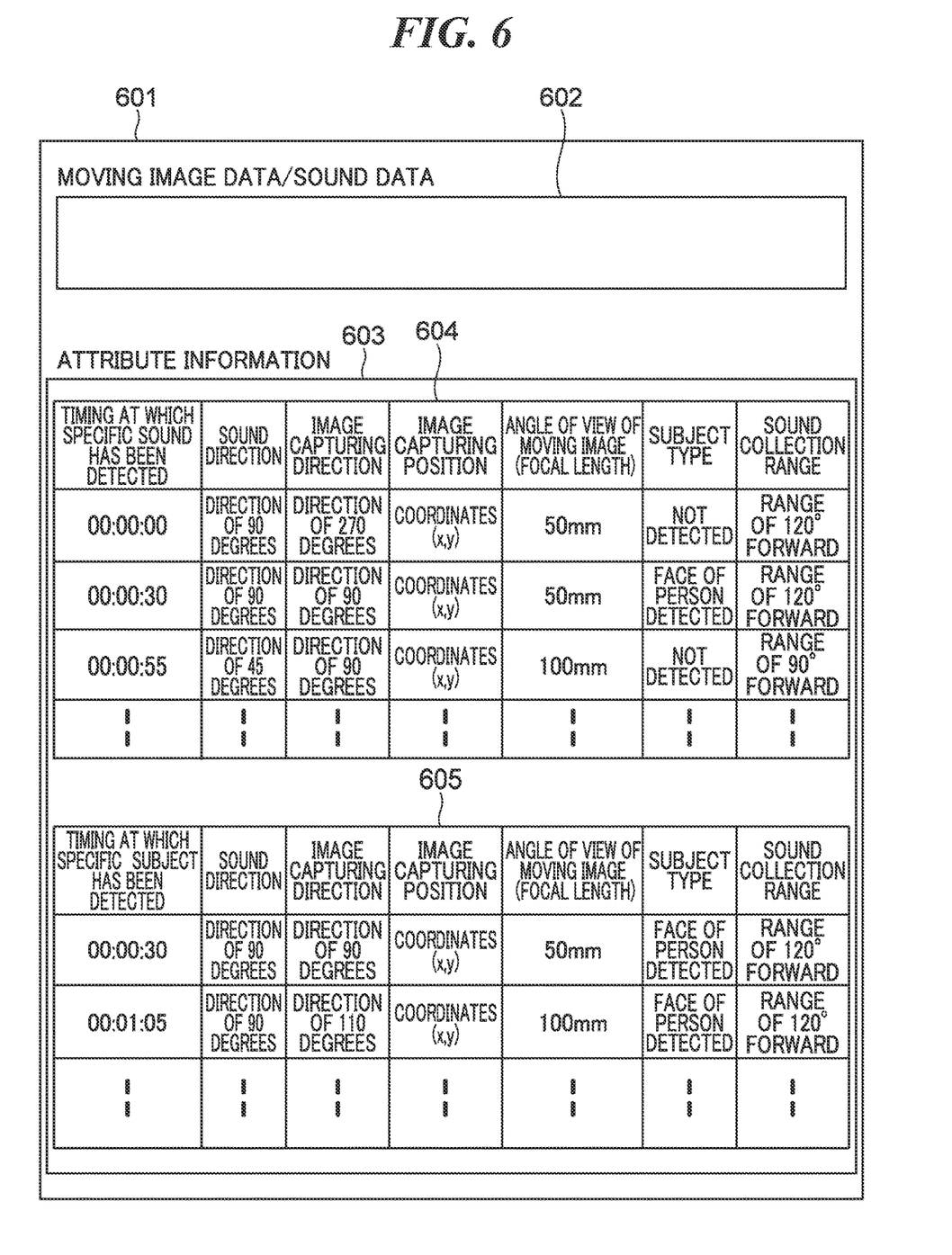
FIG. 6 is a diagram that shows a structure example of a moving image file that includes the moving image data, sound data, and the attribute information thereof that are stored by a processing shown in the flowchart of FIG. 4 and a processing shown in the flowchart of FIG. 5.

FIG. 6 is a diagram that shows a structure example of a moving image file 601 that includes the moving image data, the sound data, and the attribute information thereof that are stored by the processing shown in the flowchart of FIG. 4 and the processing shown in the flowchart of FIG. 5. In FIG. 6, a reference numeral 601 denotes the moving image file that includes the moving image data, the sound data, and the attribute information. A reference numeral 602 denotes the moving image data and the sound data. A reference numeral 603 denotes the attribute information stored together with the image data 602. The attribute information 603 includes attribute information 604 and attribute information 605.

The attribute information 604 is information stored by the processing shown in the flowchart of FIG. 4. The attribute information 604 includes the respective pieces of information stored in the steps S404, S405, S406, and S407 in the storage unit 206. That is, the attribute information 604 includes the respective pieces of information indicating the timing at which the specific sound has been detected, the sound direction, the image capturing direction, the angle of view of the moving image, the subject type, and the sound collection range. It should be noted that the timing at which the specific sound has been detected in the attribute information 604 may be detected by sound analysis after the moving image capturing ends. In addition, the subject type in the attribute information 604 may be detected by image analysis after the moving image capturing ends. Furthermore, unlike the case of the present embodiment, in a case that the sound data of all the microphones for direction detection is stored, the sound direction in the attribute information 604 may be judged by the sound analysis after the moving image capturing ends.

The attribute information 605 is information stored by the processing shown in the flowchart of FIG. 5. The attribute information 605 includes the respective pieces of information stored in the steps S504, S505, and S506 in the storage unit 206. That is, the attribute information 605 includes the respective pieces of information indicating the timing at which the specific subject has been detected, the sound direction, the image capturing direction, the angle of view of the moving image, the subject type, and the sound collection range. It should be noted that the timing at which the specific subject has been detected and the subject type in the attribute information 605 may be detected by the image analysis after the moving image capturing ends.

As shown in FIG. 6, in the attribute information 604, the respective pieces of information indicating the sound direction, the image capturing direction, the angle of view of the moving image, the subject type, and the sound collection range are associated with the information indicating the timing at which the specific sound has been detected. Furthermore, in the attribute information 605, the respective pieces of information indicating the image capturing direction, the angle of view of the moving image, the subject type, and the sound collection range are associated with the information indicating the timing at which the specific subject has been detected. Furthermore, in the attribute information 604, although the information indicating the timing at which the specific sound has been detected is represented by time, and may be represented by another method such as being represented by the number of frames from the start of the moving image capturing. The same applies to the information indicating the timing at which the specific subject has been detected in the attribute information 605.

Furthermore, in the attribute information 604 and the attribute information 605, although the image capturing position is represented by two-dimensional coordinates, the image capturing position is not limited to this representing method and for example, may be represented by another method such as being represented by three-dimensional coordinates. Furthermore, in the attribute information 604 and the attribute information 605, although the angle of view of the moving image is represented by a 35 mm equivalent focal length (unit: mm), it is not limited to this representing method and for example, may be represented by another method such as being represented by an angle (unit: °).

In addition, in the attribute information 604 and the attribute information 605, although the subject type is represented by using the information about whether or not the face of a person has been detected, the subject type is not limited to this representing method. For example, the subject type may be represented by using other information such as text information indicating the type of the subject. In addition, in the attribute information 604 and the attribute information 605, although the sound collection range is represented by using an angle in a range in which the sound input unit 104 is able to collect the sound around the direction in which the image pickup unit 102 of the movable image pickup unit 100 is facing, the sound collection range is not limited to this representing method. For example, the sound collection range may be represented by another method such as being represented by microphone sensitivity in each direction.

Figure 7:
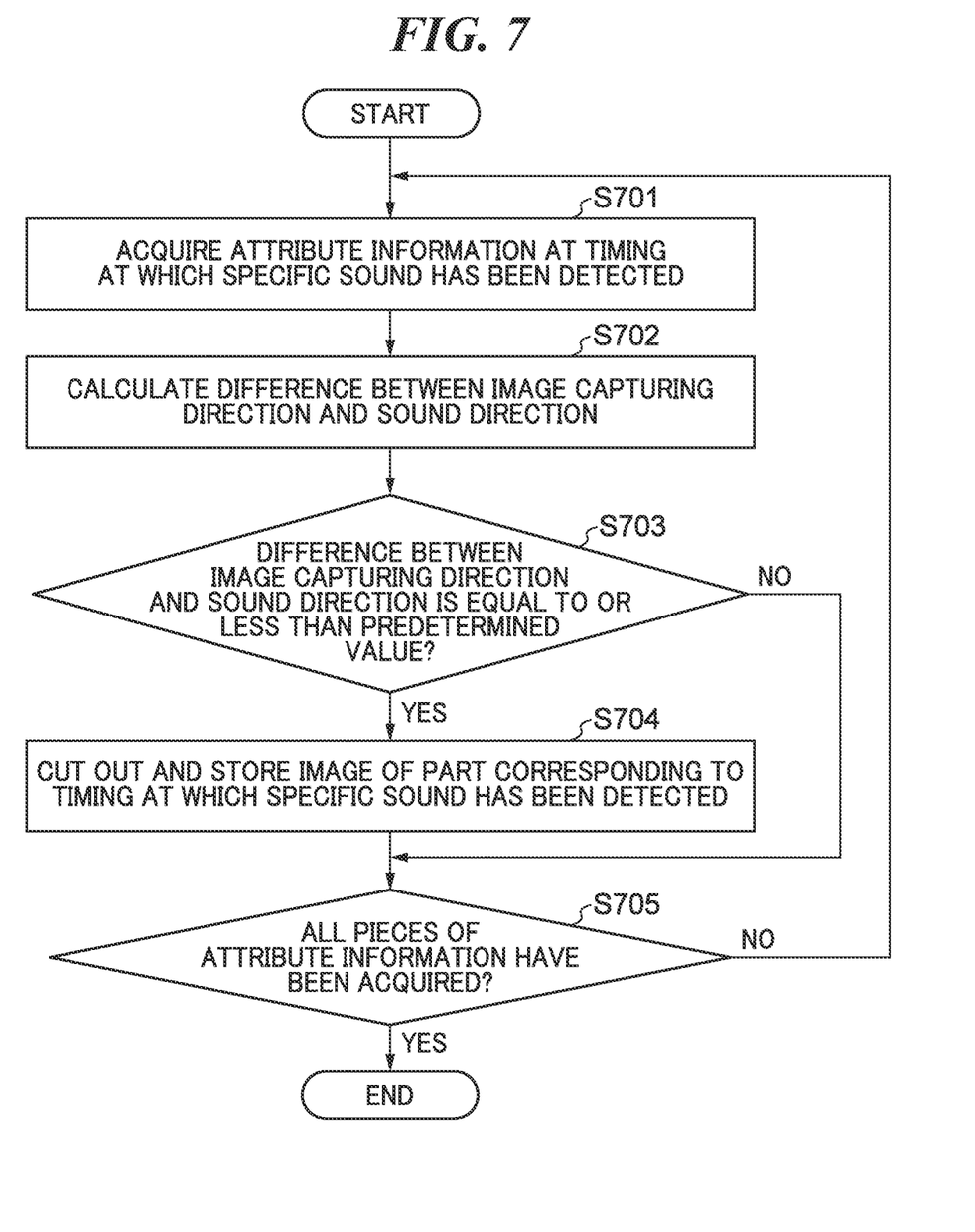
FIG. 7 is a flowchart that shows a processing for cutting out a predetermined portion from the moving image data and the sound data stored in the moving image file shown in FIG. 6 based on the attribute information stored in the moving image file shown in FIG. 6.

FIG. 7 is a flowchart that shows a processing that cuts out a portion from the moving image and the sound stored in the moving image file 601 shown in FIG. 6 based on the attribute information stored in the moving image file 601 shown in FIG. 6. Steps S701 to S705 in the flowchart of FIG.

7 are implemented in such a manner that the CPU of the central control unit 201 of the image pickup apparatus 1 loads a program stored in the ROM to the RAM and executes the program. It should be noted that the steps S701 to S705 in the flowchart of FIG. 7 may be implemented by an image processing apparatus separate from the image pickup apparatus 1, for example, a desktop or notebook (laptop) personal computer (PC), a tablet terminal, a smartphone, or the like. In this case, the moving image file 601 is transmitted from the image pickup apparatus 1 to the image processing apparatus separate from the image pickup apparatus 1 via the external input/output terminal unit 208 or the wireless unit 214.

As shown in FIG. 7, in the step S701, the central control unit 201 designates one piece of information of a plurality of pieces of information indicating the timing at which the specific sound has been detected by referring to the attribute information 604 shown in FIG. 6. Furthermore, the central control unit 201 acquires information about the sound direction and information about the image capturing direction that are associated with the one piece of information designated. Hereinafter, the timing at which the specific sound has been detected that is indicated by the information designated in the step S701, is referred to as the timing designated in the step S701.

In the step S702, the central control unit 201 calculates a difference between the sound direction and the image capturing direction acquired in the step S701. In the step S703, the central control unit 201 determines whether or not the difference calculated in the step S702 is equal to or less than a predetermined value. In the case that the central control unit 201 determines that the difference calculated in the step S702 is equal to or less than the predetermined value, the processing proceeds to the step S704. In such a case, since the sound direction and the image capturing direction are close to each other, it is considered that there is a high possibility that the subject generating the specific sound is captured within the angle of view of the moving image corresponding to the timing indicated by the one piece of attribute information designated in step S701. On the other hand, in the case that the central control unit 201 determines that the difference calculated in the step S702 is not equal to or less than the predetermined value, the processing proceeds to the step S705.

In the step S703, the condition under which the processing proceeds to the step S704 may be another condition. For example, the another condition may be such a condition, that is, the fact that the face of a person has been detected is stored in the information about the subject type at the timing indicated by the one piece of attribute information designated in the step S701 in addition to that the difference calculated in the step S702 is equal to or less than the predetermined value (the step S703). Even in such a case, since the sound direction and the image capturing direction are close to each other, it is considered that there is a high possibility that the person whose face has been detected is generating the specific sound. It should be noted that although the predetermined value to be compared with the difference between the sound direction and the image capturing direction in the step S703 is a fixed value, and may be a value that is changed in response to the angle of view of the moving image at the timing indicated by the one piece of attribute information designated in the step S701. In such a case, in the step S703, the image pickup apparatus 1 is able to compare the difference between the sound direction and the image capturing direction with a predetermined value suitable for an image capturing range when the specific sound has been detected. Therefore, when the processing proceeds to the step S704, it is possible to increase reliability of the possibility that the subject generating the specific sound is captured within the image capturing view angle of the image pickup apparatus 1.

In the step S704, the central control unit 201 cuts out the moving image and the sound of a portion including the timing indicated by the one piece of attribute information designated in the step S701 from the moving image and the sound of the moving image data and the sound data 602 of the moving image file 601, and performs editing to store the cut oud moving image and sound as another moving image file. For example, in the step S704, the central control unit 201 cuts out the moving image and the sound for a predetermined period of time that starts from the timing indicated by the one piece of attribute information designated in the step S701. Here, the predetermined period of time is set to a period of time of about several seconds to 10 seconds, but may be set to another period of time. Furthermore, in a case that a detection timing of the specific sound indicated by another piece of attribute information is present within the predetermined period of time that starts from the timing indicated by the one piece of attribute information designated in the step S701 and the difference between the sound direction and the image capturing direction at the detection timing of the specific sound is equal to or less than the predetermined value, the central control unit 201 may further perform cutting out. That is, the central control unit 201 may further cut out the moving image and the sound for the predetermined period of time that starts from the detection timing of the specific sound indicated by the another piece of attribute information. The central control unit 201 may store the moving image and the sound that are cut out in the storage unit 206 as a moving image file that has a different file name and is different from the original moving image file 601. In addition, the moving image and the sound that are cut out may be transmitted to and stored in an external storage device connected to the external input/output terminal unit 208 or the wireless unit 214. In the step S705, the central control unit 201 determines whether or not all of the plurality of pieces of information indicating the timing at which the specific sound has been detected have been designated in the step S701. In the case that the central control unit 201 determines that all of the plurality of pieces of information indicating the timing at which the specific sound has been detected have not been designated in the step S701, the processing returns to the step S701. On the other hand, in the case that the central control unit 201 determines that all of the plurality of pieces of information indicating the timing at which the specific sound has been detected have been designated in the step S701, the flowchart of FIG. 7 ends.

As described above, the image pickup apparatus 1 or the user thereof is able to efficiently retrieve the subject generating the specific sound from the image data 602 by referring to the first detection timing, the sound direction, and the image capturing direction of the attribute information 604 stored together with the image data 602. Furthermore, by such an efficient retrieving, the image pickup apparatus 1 or the user thereof is able to cut out the image data of a portion, in which the subject generating the specific sound is captured, from the original image data 602.

Furthermore, in the image pickup apparatus 1, the sound recognition unit 2043 is able to recognize and detect the sound including the specific frequency component, the sound exceeding the specific sound pressure level, the sound including the specific word, or the sound from which the specific emotion is estimated as the specific sound. Therefore, even in the case that an image capturing site of the image pickup apparatus 1 overflows with various kinds of sounds, the image pickup apparatus 1 or the user thereof is able to efficiently retrieve the image data of the portion, in which the subject generating the specific sound desired by the user is captured, from the image data 602.

Furthermore, the image pickup apparatus 1 or the user thereof is able to grasp the sound collection range when the specific sound has been detected by referring to the sound collection range of the attribute information 604 stored together with the image data 602. Furthermore, the image pickup apparatus 1 or the user thereof is able to grasp whether or not the subject type (the face of a person) is captured in the image when the specific sound has been detected by referring to the subject type of the attribute information 604 stored together with the image data 602. Furthermore, the image pickup apparatus 1 or the user thereof is able to grasp the image capturing range when the specific sound has been detected by referring to the image capturing position and the image capturing view angle of the attribute information 604 stored together with the image data 602.

Furthermore, the image pickup apparatus 1 or the user thereof is able to grasp whether or not the subject type (the face of a person) is captured in the image when the specific subject has been detected by referring to the second detection timing and the subject type of the attribute information 605 stored together with the image data 602. Furthermore, the image pickup apparatus 1 or the user thereof is able to grasp the image capturing direction of the image when the specific subject has been detected by referring to the image capturing direction of the attribute information 605 stored together with the image data 602. Furthermore, the image pickup apparatus 1 or the user thereof is able to grasp the sound collection range when the specific subject has been detected by referring to the sound collection range of the attribute information 605 stored together with the image data 602. Furthermore, the image pickup apparatus 1 or the user thereof is able to grasp the image capturing range when the specific subject has been detected by referring to the image capturing position and the image capturing view angle of the attribute information 605 stored together with the image data 602.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151619, filed on Sep. 22, 2022, which is hereby incorporated by reference herein in its entirety.

What is claimed is:

1. An image pickup apparatus comprising:
   an image pickup circuit;
   a CPU; and
   a memory that stores a program that, when executed by the CPU, causes the image pickup apparatus to function as the following units:
   a sound acquisition unit that acquires a sound;
   a sound detection unit that detects a specific sound from a sound acquired by the sound acquisition unit during moving image capturing performed by the image pickup circuit;
   a first detection unit that detects a direction in which the specific sound comes toward the image pickup apparatus and acquires information about a sound direction indicating the direction of the specific sound;
   a second detection unit that detects a direction in which the image pickup apparatus is facing and acquires information about an image capturing direction indicating the direction of the image pickup apparatus; and
   a control unit that performs control so as to store a moving image acquired by the image pickup circuit in the moving image capturing, a sound acquired by the sound acquisition unit in the moving image capturing and attribute information in a storage unit,
   wherein the attribute information includes information indicating a first detection timing at which the specific sound has been detected by the sound detection unit during the moving image capturing, information about the sound direction corresponding to the first detection timing, and information about the image capturing direction corresponding to the first detection timing.

2. The image pickup apparatus according to claim 1, wherein
   the program, when executed by the CPU, further causes the image pickup apparatus to function as the following unit:
   a processing unit that performs a processing of cutting out a period of a portion of the moving image and the sound stored in the storage unit based on the attribute information stored in the storage unit, and
   wherein, in a case that a difference between a sound direction based on the information about the sound direction corresponding to one first detection timing in the attribute information and an image capturing direction based on the information about the image capturing direction corresponding to the one first detection timing in the attribute information is equal to or less than a predetermined value, the processing unit cuts out the moving image and the sound of a period corresponding to the one first detection timing from the moving image and the sound stored in the storage unit.

3. The image pickup apparatus according to claim 2, wherein
the processing unit stores the cut out moving image and the sound in the storage unit.

4. The image pickup apparatus according to claim 2, wherein
the control unit transmits the cut out moving image and the sound to an external apparatus.

5. The image pickup apparatus according to claim 1, wherein
the control unit stores the attribute information, the moving image, and the sound in the same file and stores the file in the storage unit.

6. The image pickup apparatus according to claim 1, wherein
the sound detection unit detects a sound including a specific frequency component as the specific sound.

7. The image pickup apparatus according to claim 1, wherein
the sound detection unit detects a sound exceeding a specific sound pressure level as the specific sound.

8. The image pickup apparatus according to claim 1, wherein
the sound detection unit detects a sound including a specific word as the specific sound.

9. The image pickup apparatus according to claim 1, wherein
the sound detection unit detects a sound, from which a specific emotion is estimated, as the specific sound.

10. The image pickup apparatus according to claim 1, wherein
the attribute information includes information about a sound collection range of the sound acquisition unit corresponding to the first detection timing.

11. The image pickup apparatus according to claim 1, wherein
the program, when executed by the CPU, further causes the image pickup apparatus to function as the following unit:
a position detection unit that detects an image capturing position of the image pickup apparatus, and
the attribute information includes
information about the image capturing position of the image pickup apparatus corresponding to the first detection timing, and
information about an angle of view of the moving image corresponding to the first detection timing.

12. The image pickup apparatus according to claim 1, further comprising:
a plurality of microphones,
wherein the sound acquisition unit acquires the sound using the plurality of microphones, and
wherein the first detection unit detects the direction of the specific sound in accordance with outputs from the plurality of microphones.

13. A method comprising:
acquiring a sound;
detecting a specific sound from a sound acquired during moving image capturing by an image pickup apparatus;
detecting a direction in which the specific sound comes toward the image pickup apparatus and acquiring information about a sound direction indicating the direction of the specific sound;
detecting a direction in which the image pickup apparatus is facing and acquiring information about an image capturing direction indicating the direction of the image pickup apparatus;
performing control so as to store a moving image acquired in the moving image capturing, a sound acquired in the moving image capturing and attribute information in a storage unit, and
wherein the attribute information includes information indicating a first detection timing at which the specific sound has been detected during the moving image capturing, information about the sound direction corresponding to the first detection timing, and information about the image capturing direction corresponding to the first detection timing.

14. The method according to claim 13, further comprising:
cutting out a period of a portion of the moving image and the sound stored in the storage device based on the attribute information stored in the storage unit, and
wherein in the cutting out, in a case that a difference between a sound direction based on the information about the sound direction corresponding to one first detection timing in the attribute information and an image capturing direction based on the information about the image capturing direction corresponding to the one first detection timing in the attribute information is equal to or less than a predetermined value, the moving image and the sound of a period corresponding to the one first detection timing are cut out from the moving image and stored in the storage unit.

15. A non-transitory computer-readable storage medium storing a program for causing a computer to execute a method comprising:
acquiring a sound;
detecting a specific sound from a sound acquired during moving image capturing by an image pickup apparatus;
detecting a direction in which the specific sound comes toward the image pickup apparatus and acquiring information about a sound direction indicating the direction of the specific sound;
detecting a direction in which the image pickup apparatus is facing and acquiring information about an image capturing direction indicating the direction of the image pickup apparatus;
performing control so as to store a moving image acquired in the moving image capturing, a sound acquired in the moving image capturing and attribute information in a storage unit, and
wherein the attribute information includes information indicating a first detection timing at which the specific sound has been detected during the moving image capturing, information about the sound direction corresponding to the first detection timing, and information about the image capturing direction corresponding to the first detection timing.

* * * * *